United States Patent [19]

Kamiya et al.

[11] Patent Number: 4,471,851
[45] Date of Patent: Sep. 18, 1984

[54] MUD GUARD SYSTEM FOR MOTORCYCLE

[75] Inventors: Tadashi Kamiya; Shigeru Hattori, both of Saitama, Japan

[73] Assignee: Honda Giken Kogyo Kabushiki Kaisha, Tokyo, Japan

[21] Appl. No.: 413,200

[22] Filed: Aug. 30, 1982

[30] Foreign Application Priority Data

Sep. 5, 1981 [JP] Japan ............................. 56-139238

[51] Int. Cl.³ .......................................... B62J 13/02
[52] U.S. Cl. .............................. 180/219; 280/289 G; 474/144
[58] Field of Search ............... 474/144, 147; 180/219, 180/231; 280/261, 289 G, 289 S

[56] References Cited

U.S. PATENT DOCUMENTS 1,195,133  8/1916  Brown ................................ 474/147
4,158,402  6/1979  Romans ............................. 474/147

Primary Examiner—Joseph F. Peters, Jr.
Assistant Examiner—D. Lynn Fugate
Attorney, Agent, or Firm—Sughrue, Mion, Zinn, Macpeak & Seas

[57] ABSTRACT

The mud guard system for a chain of a motorcycle in which a drive chain is made to run on both a front sprocket connected to an engine and a sprocket connected to a rear wheel at the trailing end of a rear fork, comprises a mud guard member having a cylindrical shape for allowing the chain to run therethrough and disposed at one side of the rear wheel and a link or another connecting member for coupling the mud guard member floatingly to the rear fork so that the mud guard member can move in the longitudinal direction of the chain.

13 Claims, 10 Drawing Figures

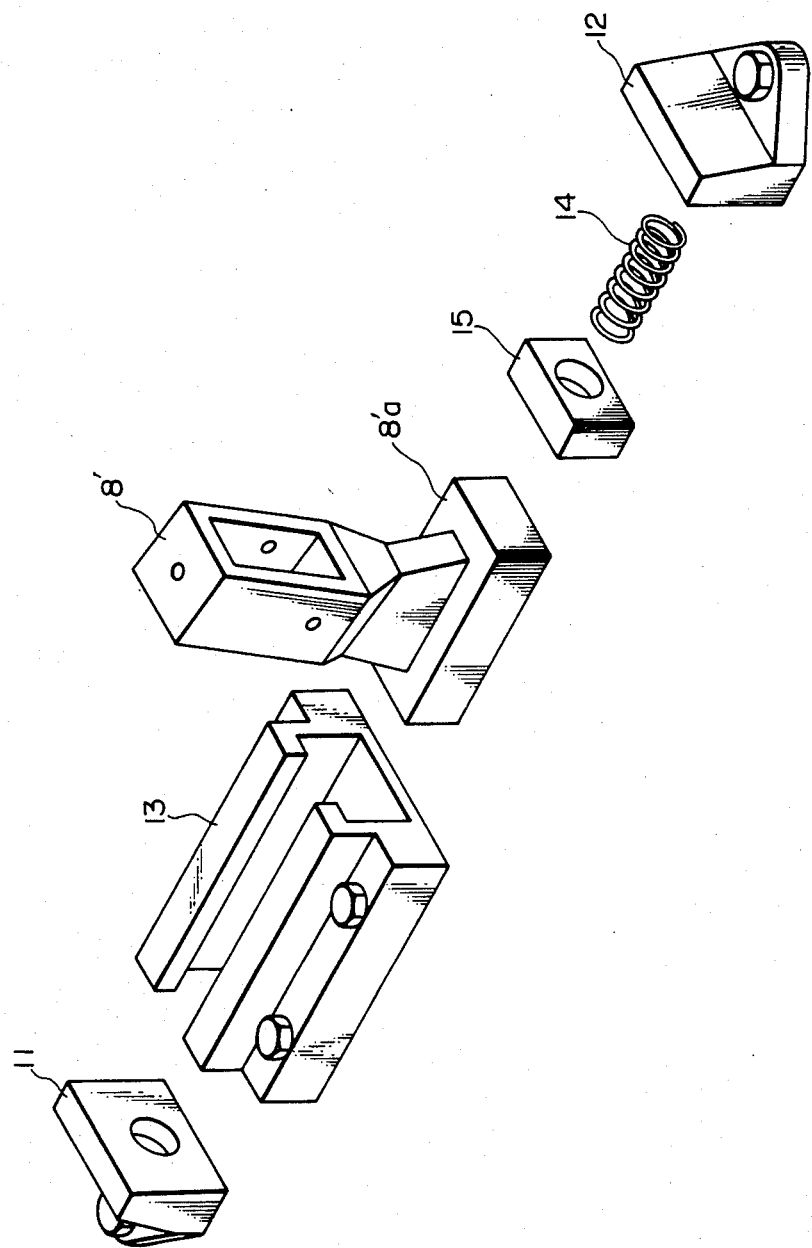

MUD GUARD SYSTEM FOR MOTORCYCLE

BACKGROUND OF THE INVENTION

The present invention relates to a mud guard system for a drive chain of a motorcycle.

As the mud guard device of the above-specified type, there is known in the prior art a mud guard device in which a drive chain is made to run on both a front sprocket connected to an engine and a sprocket connected to a rear wheel at the trailing end of a rear fork and which is equipped with a chain cover or another mud guard member for enclosing said chain. In this case, however, the mud guard member is generally of the type, which is fixed to the rear fork, and it must necessarily have relatively large size.

SUMMARY OF THE INVENTION

Accordingly, an object of the present invention is to overcome the above noted defects.

This and other objects of the invention can be attained by providing a mud guard for a motorcycle having a chain laid around a front sprocket coupled to an engine and a rear sprocket coupled to a rear wheel on a rear side of a rear fork, the mud guard system including a hollow mud guard member through which the chain is allowed to run and means for coupling the mud guard member to the rear fork, the mud guard member being movable in a chain driving direction.

BRIEF DESCRIPTION OF THE DRAWINGS

In the accompanying drawings:

FIG. 9 is an exploded perspective view of the device shown in FIG. 8; and

DETAILED DESCRIPTION OF THE INVENTION

Figure 3:
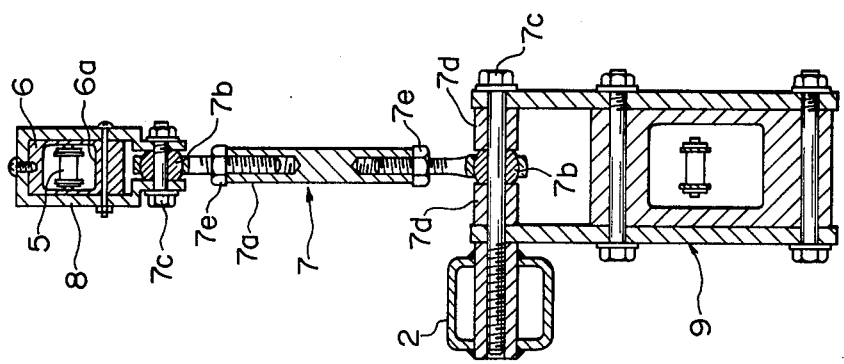
FIG. 3 is a section taken along the line III—III of FIG. 2.
Figure 1:
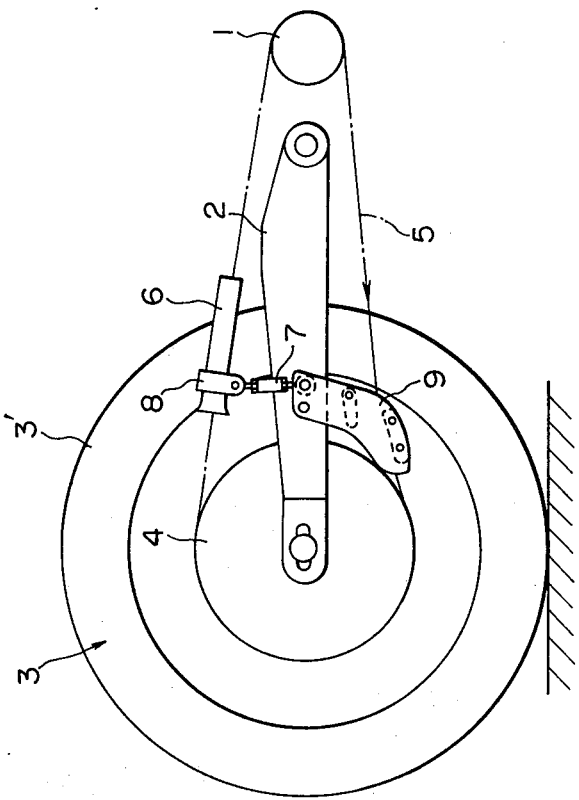
FIG. 1 is a side elevation showing one embodiment of the device according to the present invention.
Figure 2:
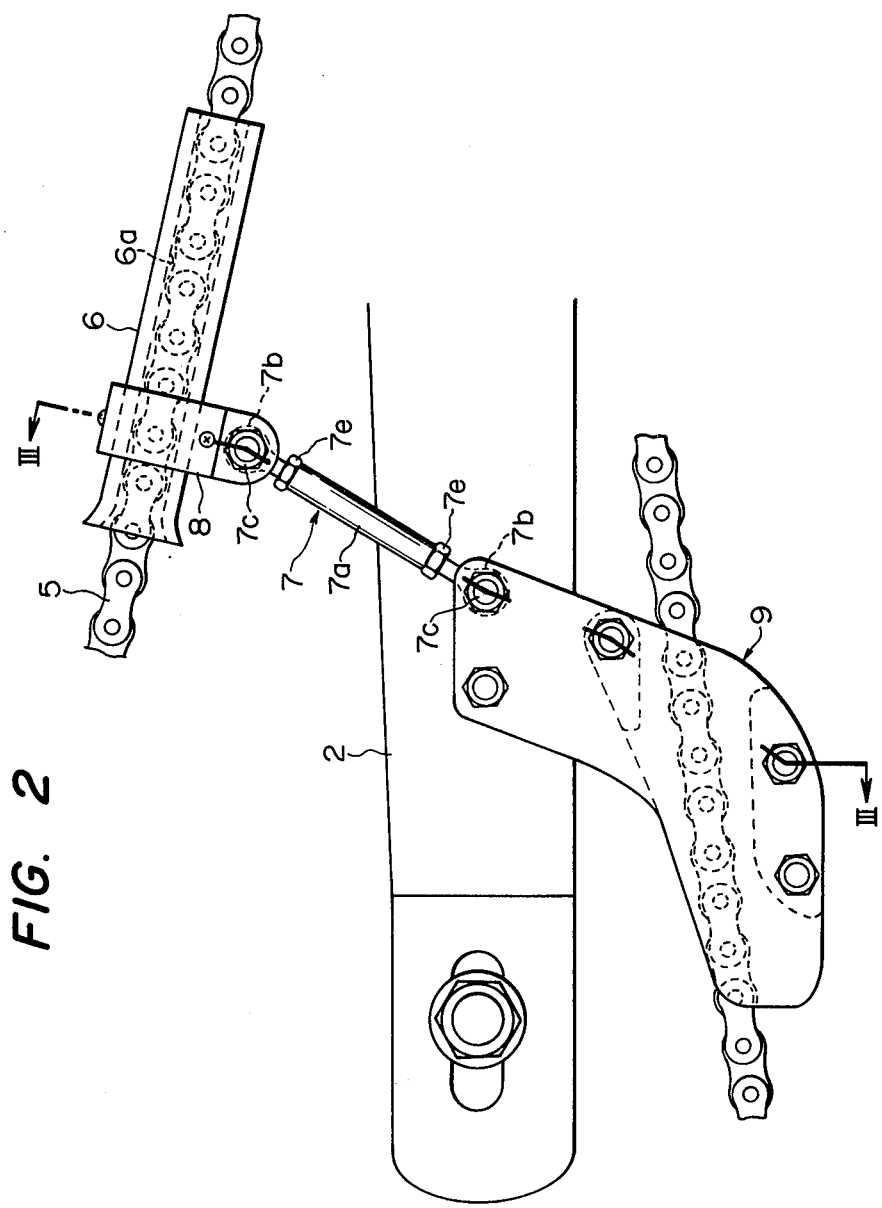
FIG. 2 is an enlarged side elevation showing an essential portion of the same.

The present invention will now be described in connection with one embodiment thereof with reference to the accompanying drawing.

In the accompanying drawing: reference numeral 1 indicates a front sprocket which is connected to an engine at the middle portion of a motorcycle body in a well known manner; numeral 2 indicates a rear fork which extends rearwardly from the body; and numeral 3 indicates a rear wheel which is suspended by the trailing end of the rear fork 2. Between the sprocket 1 and an associated sprocket 4 located on the rear side and coupled to the rear wheel 3, there is laid a drive chain 5 through which the rear wheel 3 is driven by the engine.

At one side of the rear wheel 3, there is disposed a mud guard member 6 which has a cylindrical shape for allowing the chain 5 to run therethrough. The mud guard member 6 is connected to the rear fork 2 by means of a connecting member 7 such as a link so that the mud guard can move in the longitudinal direction of the chain 5. A plurality of links 7 may be used.

The mud guard member 6 is made of a synthetic resin such as nylon and has its through hole 6A diverging rearwardly to smoothen the travel of the chain 5 therethrough. The length of the mud guard member 6 is set, as shown, to be preferably equal to or slightly larger than the radial width of the sidewall of a tire 3' of the wheel 3. The connecting member 7 is of the type in which a connecting rod 7a has on both ends coupling rods 7b each having spherical bearings. One of the coupling rods 7b is hinged around a mounting bolt 7c to a holder 8 which is fixed on the periphery of the mud guard member 6 by screws, whereas the other is hinged to the rear fork 2 around the mounting bolt 7c. Thus, the connecting member 7 is supported in a floating state. Moreover, the rod 7a is formed into a turnbuckle shape and has its end portions equipped with lock nuts 7e so that the length of the connecting member 7 can be freely adjusted.

The device shown is equipped with a chain guide 9 which is disposed below the rear fork 2. The guide 9 is fastened together with the connecting rod 7a by means of the aforementioned mounting bolt 7c. Reference numeral 7d indicates spacers which are interposed on the mounting bolt 7c.

The operation of the device of the present invention will now be described. The mud guard member 6 surrounds the chain 5 thereby to protect it against mud, which is splashed from the outside, and to scrape off and remove the mud which is caught by the chain 5 and which would otherwise be guided into the front sprocket 1. Thus, the mud guard member 6 can protect the front sprocket 1 against mud. It is also to be noted that the mud guard member 6 is made movable in the longitudinal or travelling direction of the chain 5 so that it receives no excessive force.

According to the present invention, the mud guard member is formed into the cylindrical shape and disposed at the side of the rear wheel for allowing the drive chain to run therethrough so that it can be connected to the rear fork in a manner to follow the chain. The member is especially advantageous in that it can be of relatively small size and weight to eliminate the aforementioned disadvantage concomitant with the prior art, and its operation can be smoothened and ensured.

Figure 4:
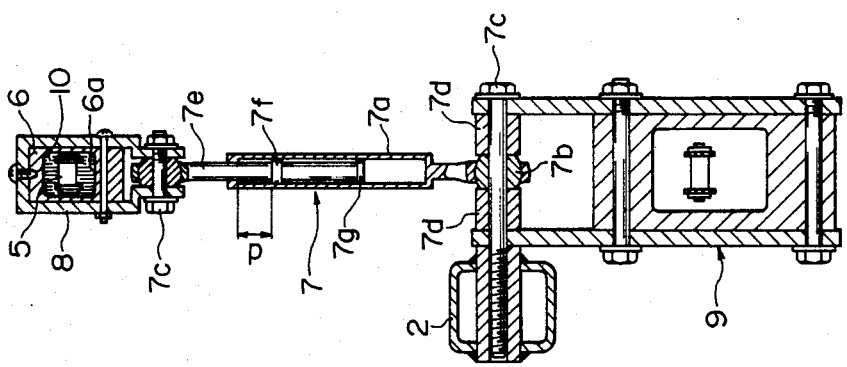

FIG. 4 shows another embodiment of the present invention, in which the mud guard member 6 is allowed to move along the chain 5 to some extent. The connecting member 7 is modified as follows. A connecting rod 7e is rotatably coupled at an upper end to the aforesaid mounting bolt 7c. The connecting rod 7e is provided at an intermediate portion with a stop 7f and at a lower end with a guide member 7g. The connecting rod 7e is slidably inserted into a hollow cylindrical member 7a as shown. Thus, the connecting unit 7 is extendible in association with a movement of the mud guard member 6. In this case, a distance d between an inner upper end of the hollow cylindrical member 7a and an upper end surface of the stop 7 located in a lowermost position, that is, a stroke of the connecting rod 7e is set so that the mud guard member 6 is prevented from moving away from the portion of the chain corresponding to the width of the tire 3' of the rear wheel 3.

In FIG. 4, preferably, a brush member 10 is provided suitably in an interior of the mud guard member 6 to clean the chain 5 effectively.

Figure 6:
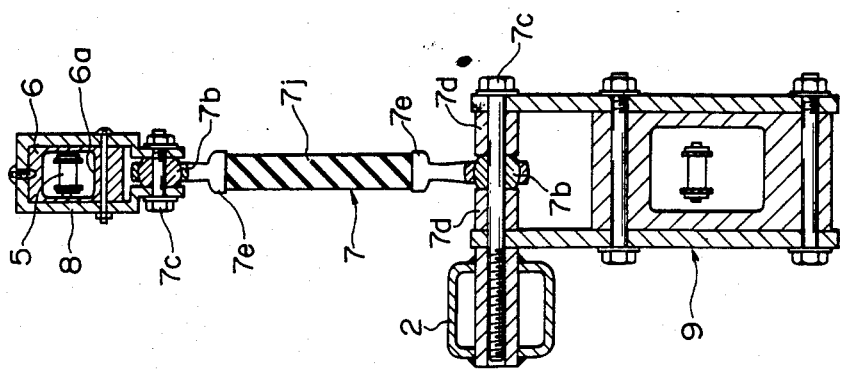
FIGS. 4 to 7 show modifications of the connecting rod unit according to the present invention.
Figure 5:
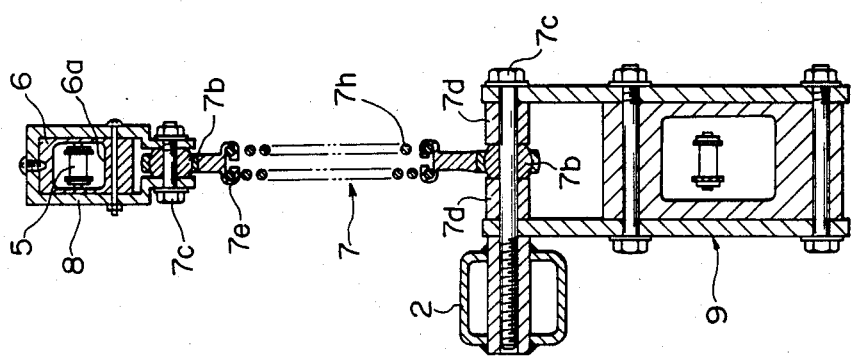

FIGS. 5 and 6 show other modifications to the embodiment shown in FIG. 4. In FIG. 5, a coil spring 7h is used as a connecting rod unit 7. In FIG. 6, a solid cylinder 7j made of elastic material such as rubber is used as a connecting rod unit 7. In these embodiments, substantially the same effect may be obtained.

Figure 7:
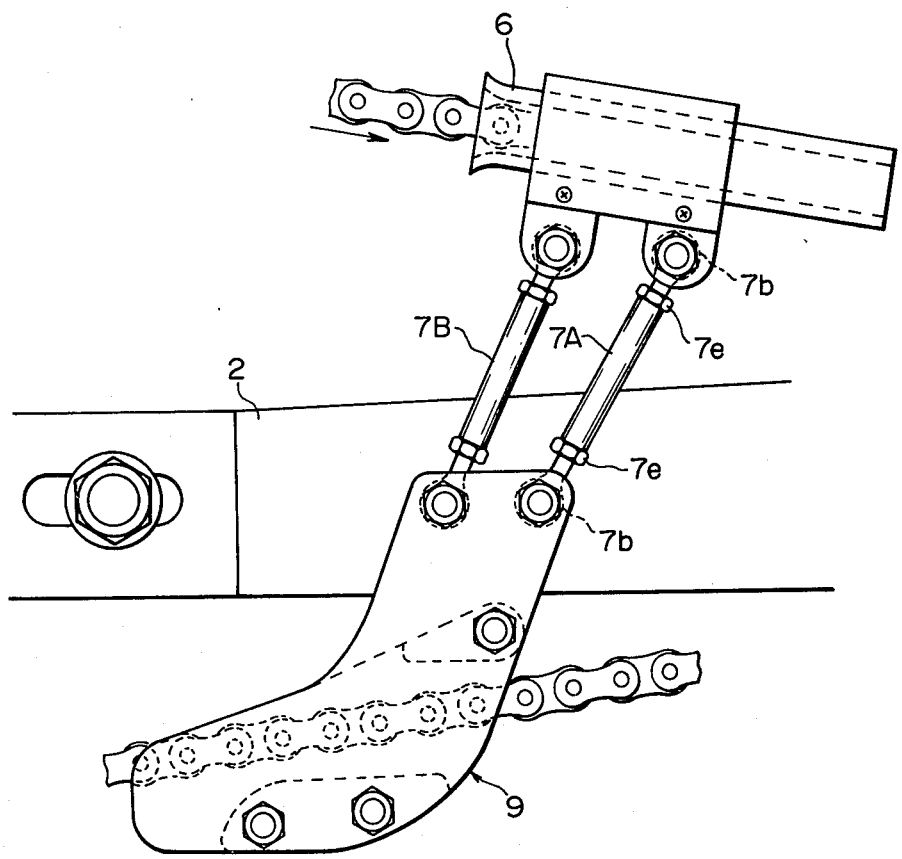

FIG. 7 shows still another embodiment of the invention. In FIG. 7, a plurality (two in the embodiment) of connecting rods 7A and 7B are used in parallel to each other. Each of the connecting rods 7A and B may be of any type described in FIGS. 1 to 6. The parallel link type shown in FIG. 7 is effective to prevent the unnecessary movement of the mud guard member 6 so that the outwardly diverging portion of the mud guard member 6 may always be directed toward the chain introducing direction.

Figure 10:
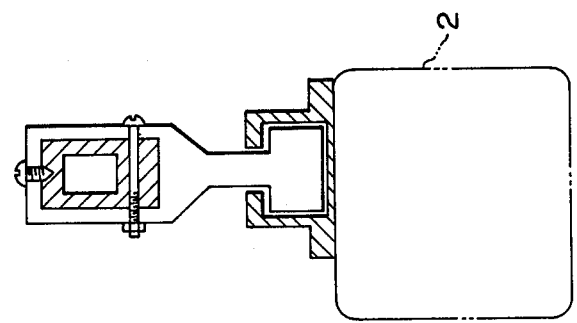
FIG. 10 is a cross-sectional view of the device taken along the line X—X of FIG. 8.
Figure 8:
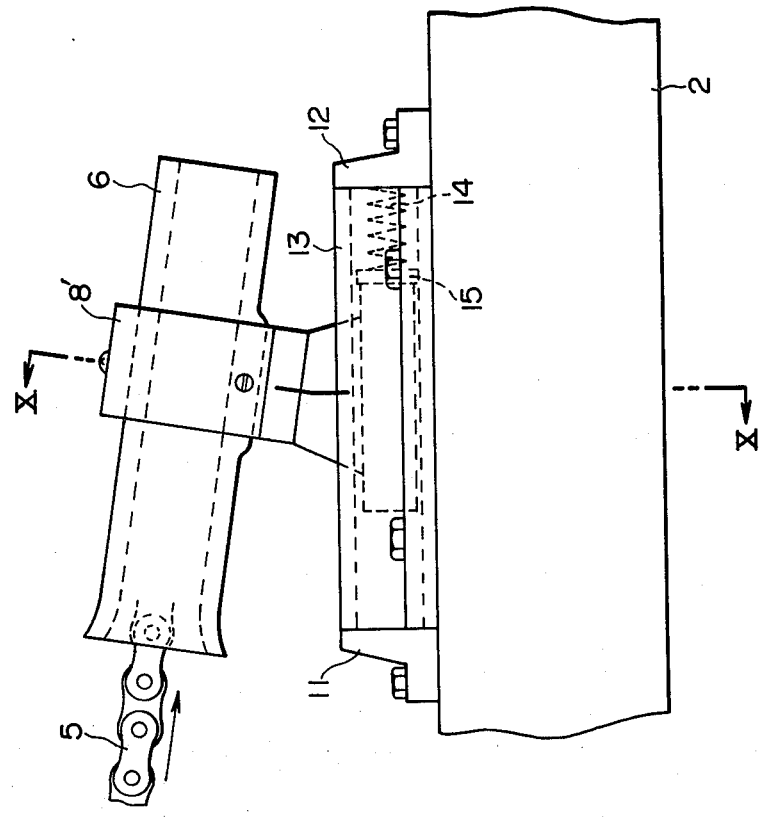
FIG. 8 shows another embodiment of the mud guard device according to the present invention.

Another embodiment of the mud guard unit according to the present invention will now be described with reference to FIGS. 8 to 10. FIG. 8 shows a side view of a slide type mud guard unit. FIG. 9 is an exploded perspective view of the unit shown in FIG. 8. FIG. 10 is a cross-sectional view of the unit taken along the line X—X of FIG. 8. In the mud guard unit, a rail member 13 is fixed to the rear fork 2. A slider 8'a integrally formed with a holder 8' for the mud guard 6 is slidably engaged with the rail member 13. On both ends of the rail member 13 are provided a pair of stops 11 and 12. A coil spring 14 whose one end is housed by a sliding holder 15 is interposed between the stop 12 and the sliding portion 8'a of the holder 8' within the rail member 13, whereby the holder 8', that is, the mud guard member 6 is urged to move toward the chain 5 introducing direction. In this embodiment, it is to be noted that the mud guard member 6 is not vibrated up and down and is advantageous as the chain guide device.

What is claimed is:

1. A mud guard system for a motorcycle, said motorcycle having a chain laid around a front sprocket coupled to an engine and a rear sprocket coupled to a rear wheel on a rear side of a rear fork, said rear wheel having a rear tire mounted thereon, said mud guard system including a hollow mud guard member through which said chain is allowed to run for scraping mud from said chain, said mud guard being substantially equal in length to the radial width of said rear tire, and means for movably coupling said mud guard member to said rear fork to permit movement of said mud guard member in a chain driving direction for reducing the amount of force exerted on said mud guard member by said chain while scraping mud from said chain.

2. The mud guard system of claim 1, in which said hollow mud guad member has a cylindrical shape.

3. The mud guard system of claim 2, in which said hollow mud guard member has an outwardly skirted portion at a chain introducing portion.

4. The mud guard system of claim 1, further including a chain guide for guiding the travelling of said chain.

5. A mud guard system for a motorcycle having a chain laid around a front sprocket coupled to an engine and a rear sprocket coupled to a rear wheel on a rear side of a rear fork, said mud guard system including a hollow mud guard member through which said chain is allowed to run and coupling means comprising a holder fixed to said mud guard member and a coupling unit rotatably coupled at one end to said holder and at the other end to said rear fork for coupling said mud guard member to said rear fork, said mud guard member being movable in a chain driving direction.

6. The mud guard system of claim 5, in which said coupling unit is made of rigid and solid material.

7. The mud guard system of claim 5, in which said coupling unit is comprised of a hollow cylinder and a slidable rod.

8. The mud guard system of claim 5, in which said coupling unit includes a coil spring.

9. The mud guard system of claim 5, in which said coupling unit is at least partially made of elastic material.

10. A mud guard system for a motorcycle having a chain laid around a front sprocket coupled to an engine and a rear sprocket coupled to a rear wheel on a rear side of a rear fork, said mud guard system including a hollow mud guard member through which said chain is allowed to run and coupling means comprising a holder fixed to said mud guard member, a sliding member fixed to said holder, and a rail device fixed to said rear fork, said rail device being adapted to slidably receive said sliding member therein, said coupling means for coupling said mud guard member to said rear fork, said mud guard member being movable in a chain driving direction.

11. The mud guard system of claim 10, in which said rail device including means for biasing said mud guard member in a direction opposite the chain travelling direction.

12. The mud guard system of any one of claims 6 to 9 and 10, in which a brush member is provided in said mud guard member.

13. The mud guard system of claim 5, said coupling means including a plurality of said coupling units substantially in parallel to each other.

* * * * *